Sept. 11, 1923.  1,467,338
M. SALOUN
PRESERVING RECEPTACLE
Filed Feb. 12, 1921    2 Sheets-Sheet 2

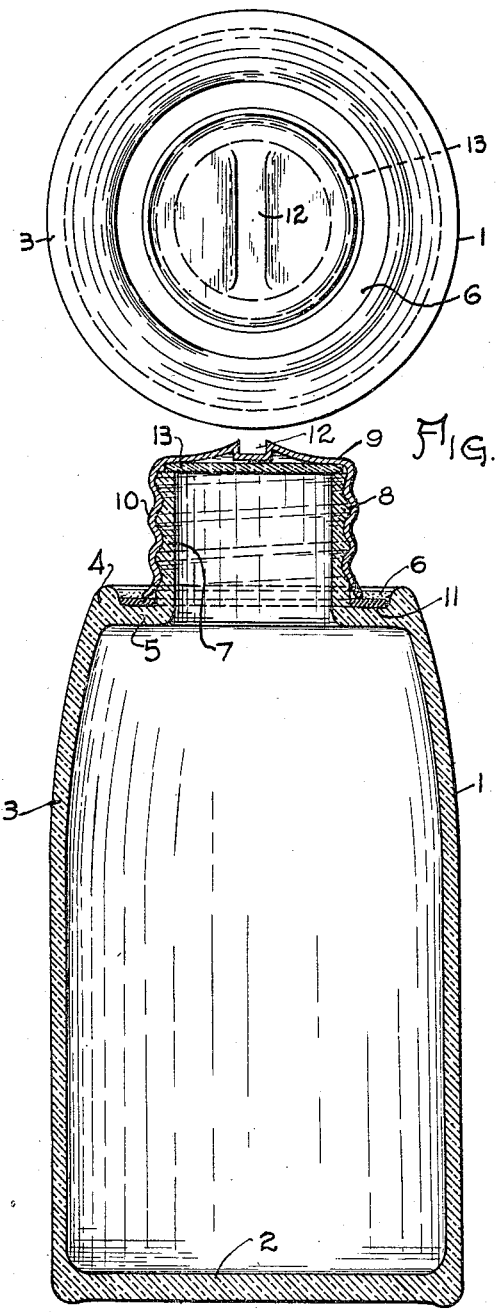

INVENTOR
Martin Saloun
BY
Frank Schraeder
Attorney

Patented Sept. 11, 1923.

1,467,338

UNITED STATES PATENT OFFICE.

MARTIN SALOUN, OF MILWAUKEE, WISCONSIN.

PRESERVING RECEPTACLE.

Application filed February 12, 1921. Serial No. 444,363.

*To all whom it may concern:*

Be it known that I, MARTIN SALOUN, a citizen of the Republic of Czechoslovakia, residing at Milwaukee, in the county Milwaukee and the State of Wisconsin, have invented a new and useful Improvement in a Preserving Receptacle, of which the following is a specification.

The invention relates to bottles and means for applying thereto or removing therefrom a cap.

An object of the invention aims at the provision of a tool which may be conveniently and rapidly applied to the cap of the bottle and the cap secured on the bottle or removed therefrom with little exertion.

A further object aims at the provision of a tool with the central member adapted to be arranged in the groove provided in the bottle cap, there being levers connected to said central member so that a maximum turning effect is imparted to said member upon manipulation of said levers.

A still further object aims at the provision of a tool in which the levers engage the central member at diametrical opposite points with respect to the axis of rotation and out of contact with the bottle cap so that a maximum turning movement is applied to the member and thereby to the cap.

With these and other objects in view, which will appear as the description of the invention proceeds, the latter comprises the means set forth in the following specification, particularly pointed out in the claims forming a part thereof, and illustrated in the accompanying drawings, in which:

Fig. 1 is a vertical sectional view of a bottle or jar provided with the improved sealing means;

Fig. 2 is a top view thereof;

Figure 4:
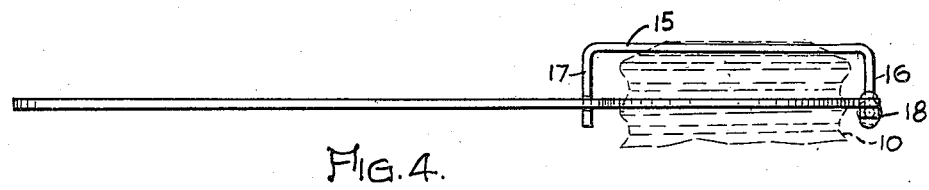
Figure 4 is a side view of the improved tool.

Referring to Figures 1 and 2 of the drawing, 1 generally denotes a bottle which has the form of a so-called Mason jar, but which of course may have any other preferred form or shape to meet special requirements. The bottle 1 is provided with a bottom 2 and with a side wall 3 which maintains uniform cross-section throughout the major portion of its height. At the upper end of the side wall 3 the same is formed with a circumferential bead 4 and thence passes into a horizontal portion 5 of less thickness than the bead 4, so that a circular groove or depression 6 is formed for a purpose hereinafter further referred to. The horizontal portion 5 passes into a vertical portion 7, constituting the neck of the bottle and is provided with corrugations 8 constituting a continuous thread for engagement with a cap, generally indicated by 9. The cap 9 is formed with corrugations 10, similar to the corrugations 8, so that the cap may be screwed onto the neck or unscrewed therefrom.

As shown in Figure 2 a gasket 11 is arranged in the seat 6 and is adapted to be engaged by the lower edge of the cap which is slightly flared outwardly. It follows therefrom that when the cap 9 is in closing position on the neck a hermetical seal is formed by virtue of the engagement between the gasket and the cap. The latter is formed at the top with a central diametrically extending groove 12 of rectangular cross-section and interposed between the top of the cap 9 and the upper edge of the bottle neck is a disc 13 which is pressed into contact with the edge of the bottle neck by the cap.

From the foregoing follows that the bottle is hermetically sealed at the top by virtue of the provision of the gasket and the disc 13 so that air or vapors cannot enter into the bottle nor escape therefrom, which is highly desirable for the proper conservation or storing of the contents intended to be placed into the bottle.

Figure 5:
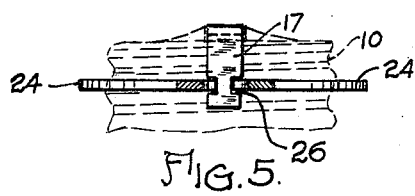
Figure 5 is a section on the line 5—5 of Figure 3.
Figure 6:
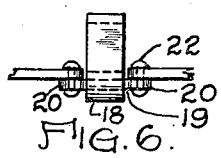
Figure 6 is an end elevation as viewed from the line 6—6 of Figure 3.

Referring to Figures 4 to 6 of the drawing, a tool is provided which is adapted to be utilized in connection with the bottle shown in Figures 1 and 2. This tool comprises a central member 15 in the form of a strip adapted to be arranged within the rectangular groove 12 of the bottle cap. The central member 15 has depending terminal portions 16 and 17 which are sufficiently spaced from one another so as to remain out of contact with the bottle cap when the tool is applied thereto. The depending portion 16 terminates in a sleeve 18 through which is passed a pin 19 terminating at both ends in eyes 20. An arm, generally designated by 21, is pivoted at one end to the pin 19 for which purpose a rivet 22 passes through the eye 20 of the pin 19 and through an aperture in the end portion of the arm 21 to movably hold these parts together. An arm, generally designated by 23, is in the same manner pivotally secured to the other eye 20 of the pin 19.

Figure 3:
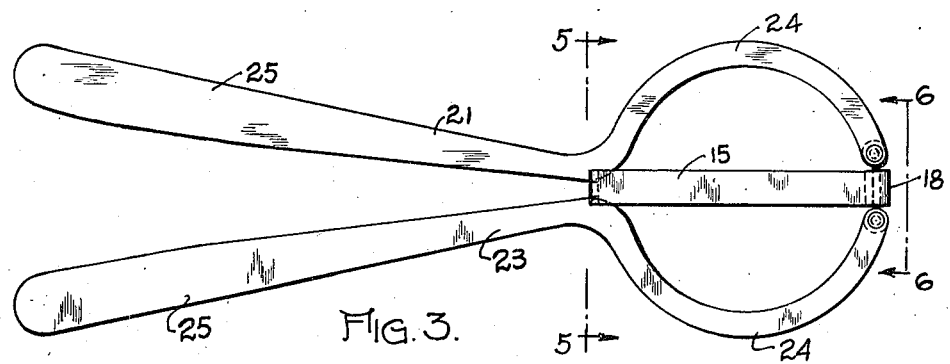
Figure 3 is a top plan view of a tool adapted to actuate the cap of the bottle shown in Figure 1.

As indicated in Figure 3 each arm comprises a semi-circular portion 24 adapted to encompass the bottle neck but having a sufficient diameter to remain out of contact therewith. The semi-circular portion 24 passes into a straight tapering portion 25 constituting a handle for the actuation of the arms 21. The depending portion 17 of the central member 15 is formed with cutout portions 26 to partially receive adjacent edges of the arms 21, 23.

The use of the tool in applying a cap to a bottle or removing a cap is thought to be obvious. The central member 15 is, as stated before, arranged so that it is received within the groove 12 of the bottle cap; thereafter the arms 21, 23 are grasped by one hand and closed so that they enter with intermediate portions the cutout portions 26 of the depending portion 17 of the central member. Rotation of the arms will be transmitted to the central member 15 at diametrical opposite points with respect to the axis of rotation and will cause the member together with the cap to rotate. In accordance with the direction of rotation the bottle cap will be either screwed onto or removed from the bottle. By making the arms sufficiently long a considerable torque may be applied to the central member 15 so that with comparatively little exertion the cap may be conveniently rotated.

While the drawing discloses the preferred embodiment of the invention, numerous changes and alterations may be made without departing from the spirit of the invention and all changes constituting departures within the scope of the invention are included as set out in the appended claims.

I claim:

1. A tool of the character described, comprising a member having depending terminal portions, and arms secured to one of said terminal portions and adapted to engage the other of said terminal portions.

2. A tool of the character described, comprising a member having depending terminal portions, arms secured to one of said terminal portions and adapted to enter recesses provided in the other of said terminal portions.

3. A tool for removing or replacing a threaded bottle cap, provided with a transverse recess in its upper portion, comprising a member shaped to enter the transverse cap recess and having downwardly extending terminal portions, and handles having semicircular portions which engage the opposite sides of the cap and are pivotally connected to one of the depending terminal portions, the other depending terminal portion extending between and engaged by the handles.

4. A tool for removing or replacing a threaded bottle cap, provided with a transverse recess in its upper portion, comprising an elongated member shaped to enter the transverse cap recess and having downwardly extending terminal portions; an eyed member pivotally extending through one of the terminal portions, and handles having semicircular portions which engage the opposite sides of the cap and are pivotally connected to the eyed portions of the eyed member, the other terminal portion of the elongated member extending between the handles and having notched portions engaged thereby.

In witness whereof, I have hereunto subscribed my name this 5th day of February, 1921.

MARTIN SALOUN.